(12) United States Patent
Qiu et al.

(10) Patent No.: US 9,596,111 B1
(45) Date of Patent: Mar. 14, 2017

(54) METHODS AND APPARATUS FOR MULTI-CHANNEL MODEM AND PREAMBLE DETECTION

(71) Applicant: Texas Instruments Incorporated, Dallas, TX (US)

(72) Inventors: Wenxun Qiu, Allen, TX (US); Minghua Fu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/849,378

(22) Filed: Sep. 9, 2015

(51) Int. Cl.
*H04B 1/38* (2015.01)
*H04L 5/16* (2006.01)
*H04L 27/14* (2006.01)
*H04L 27/16* (2006.01)

(52) U.S. Cl.
CPC .............. *H04L 27/14* (2013.01); *H04L 27/16* (2013.01)

(58) Field of Classification Search
CPC H04L 27/14; H04L 27/16; H04L 5/06; H03G 3/3068; H04B 1/16; H04Q 9/00
USPC ......... 375/219, 220, 222, 340, 345; 455/307
See application file for complete search history.

(56) References Cited

U.S. PATENT DOCUMENTS

| | | | | |
|---|---|---|---|---|
| 2007/0054642 A1* | 3/2007 | Bhardwaj | ............ | H03G 3/3036 455/234.1 |
| 2008/0013654 A1* | 1/2008 | Rick | .................... | H03G 3/3068 375/345 |
| 2011/0298634 A1* | 12/2011 | Beverung | ................ | H04Q 9/00 340/870.02 |
| 2012/0314781 A1* | 12/2012 | Boivin | ................ | H04L 25/0282 375/257 |
| 2014/0242936 A1* | 8/2014 | Seely | ........................ | H04L 5/06 455/307 |
| 2014/0314186 A1* | 10/2014 | Chang | ...................... | H04B 1/16 375/340 |

OTHER PUBLICATIONS

Texas Instruments, "Smart Grid: Flexible PLC Solution using C2000," pp. 1-37, http://e2e.ti.comlcfs-file.ashx/_key/communityserver-discussions-components-files/171/2678.5810. Flexible_2D00_PLC_2D00_solution_2D00_using_2D00_C2000. pdf, found on the world wide web on Sep. 9, 2015.

* cited by examiner

*Primary Examiner* — Phuong Phu
(74) *Attorney, Agent, or Firm* — Ronald O. Neerings; Charles A. Brill; Frank D. Cimino

(57) ABSTRACT

Methods and apparatus for multiple channel modem and preamble detection. In an example arrangement, a system includes a plurality of communication nodes coupled to one another via an over the air interface, at least one of the communication nodes including an antenna for transmitting and receiving signals on the over the air interface; a radio transceiver coupled to the antenna for receiving signals and having an output for transmitting signal samples; and a dual core processor coupled to the radio transceiver, the dual core processor comprising a first CPU and a second CPU, the first CPU configured to process signals for a first channel within the signal samples received from the radio transceiver, and the second CPU configured to process signals for a second channel within the signal samples received from the radio transceiver. Methods and additional apparatus are also disclosed.

29 Claims, 6 Drawing Sheets

METHODS AND APPARATUS FOR MULTI-CHANNEL MODEM AND PREAMBLE DETECTION

TECHNICAL FIELD

The present application relates to communication systems and in particular to smart utility network (SUN) systems. More specifically, the arrangements that form aspects of the present application relate to multi-channel preamble detection and multi-channel communications in smart utility network systems.

BACKGROUND

A smart utility network (SUN) is a low rate (5 kb/s to 1 Mb/s), low power wireless communications technology that is specifically designed to be used in utility metering applications, such as transmitting electric, gas, or water usage data from the one or more meters on the customer premises to a data collection point operated for a utility.

In the prior known solutions, different physical layers (PHYs) can be used for communications in networks such as SUN including features such as frequency shift keying (FSK), direct sequence spread spectrum (DSSS), and orthogonal frequency division multiplexing (OFDM). In an example DSSS communications system that is a closed utility network, the devices that are allowed into the network can be controlled by the utility or the network operator. Note that while some of the examples discussed herein include operation of smart utility networks, the arrangements disclosed as aspects of the present application are not so limited and can be applied and used in conjunction with DSSS communications networks, generally.

A network can be set up in a mesh configuration where devices can communicate with neighbor devices rather than just communicating with a hub. The mesh configuration helps to increase coverage since communication can be achieved even if the link from one device directly to the hub is poor. However, this can increase the amount of traffic that passes through some devices since they have to include packet data from their neighbors as well as transmitting their own data. A mesh network can be particularly appropriate for an urban or suburban area with a high density of meters and non-line-of-sight conditions between meters, where communication links between some meters and a central hub is poor.

A star configuration can be used. In a star configuration network, a hub communicates directly with each meter. This configuration can be appropriate for rural environments when the density of meters is low so that there may not be a convenient neighbor to use as an intermediate hop as in a mesh arrangement. A mix between a star and mesh configuration can also be used in some deployments.

Since utility meters have a long life span such as 20 years, there may be many generations of meters deployed in a utility network. The earlier deployed meters can be termed as legacy equipment. In one known example, all the legacy devices in the utility network can communicate using a frequency shift keyed (FSK) modulation scheme, often at a fixed data rate such as 50 kb/s, 100 kb/s or 150 kb/s.

A relevant standard has been promulgated by the IEEE, referred to as IEEE standard number 802.15.4g, entitled "Low-Rate Wireless Personal Area Networks (LR-WPANs)" issued Apr. 27, 2012 by the IEEE Computer Society and sponsored by the LAN/MAN Standards Committee. This standard identifies physical layer (PHY) specifications for low data rate, wireless, smart metering utility networks (SUN). The LR-WPAN standard is intended to provide a globally used standard that facilitates very large scale process control applications such as a utility smart-grid network capable of supporting large, geographically diverse networks with minimal infrastructure and containing potentially millions of fixed endpoints. Note that the aspects of the present application are not limited to particular applications, including the SUN applications and/or LR-WPAN standard network applications, but the various arrangements that form aspects of the present application are applicable to such applications.

FIG. 1 is an illustration of a traditional SUN network. Depicted in FIG. 1 is a traditional SUN network 100 consisting of a single communication channel 110 and multiple transceiver nodes 120A, 120B, 120C, 120D . . . 120N. In this example prior known network arrangement, the individual nodes negotiate with the other nodes for free time on the single channel for communicating their information. A collision sense scheme is used to prevent interference, and the network can be referred to as a "collision sense multiple access" (CSMA) network.

FIG. 2 is a block diagram of a known prior approach transceiver 200 used in a SUN network. Transceiver 200 is depicted with antenna 210 coupled to a PA/LNA (power amplifier/low noise amplifier) 212 which is coupled to a radio frequency (Radio Front End) front end circuit and sampler 214. The radio front end circuit 214 is coupled to a processor 216 which is coupled to a power line circuit 218. Power line circuit 218 communicates with the power line 220. A SDR (software defined radio) is comprised of software running on a programmable device 216 such as a DSP, or a pair of DSPs, to implement a radio transceiver function. In 216, CPU1 which is numbered 230 can be, for example, a DSP with a low power coprocessor (coprocessor 1) 232 that communicates with the radio front end circuit 214. CPU2 240 is a DSP with a low power coprocessor (coprocessor 2) 242 that can communicate with the power line circuit 218. This arrangement forms the architecture for a single channel SDR within a tranciever node with CPU1 handling the wireless computations/communications, for a non-limiting example, and CPU2 handling the power line computations/communications. Specific commerically available components that can be used for forming a transceiver of this example architecture include a Texas Instruments Incorporated integrated circuit CC1260 that can be arranged to serve as the radio front end circuit 214, a Texas Instruments Incorporated analog front end integrated circuit AFE032 arranged to serve as the power line interface circuit 218 and a Texas Instruments Incorporated TMS320F28377D dual core microcontroller that can be arranged to serve as dual core processor 216. The microcontroller circuit contains a pair of Control Law Accelerators (CLA) that function as the coprocessors 232 and 242. While these example commercial parts are listed as illustrative implementation details, the transceiver can be implemented using other commercially available integrated circuits, or by designing custom or semi-custom integrated circuits for various parts of the transceiver, for example FPGA, CPLD, ASIC or full custom integrated circuits could be used. The transceiver can be formed using a module, circuit board, prototyping card, and the like. Discrete components can be used for some functions of the transceiver.

In the example prior known example transceiver of FIG. 2, two DSP processors CPU1 and CPU2 are used, however only a single channel modem is provided. The result is a limit on the bandwidth available for network communications. Improvements in communication systems are therefore needed in order to provide additional bandwidth and capacity for achieving additional system performance. In the SUN application, improvements are needed in providing additional network communication capacity without the need for additional hardware components and without a substantial increase in costs.

SUMMARY

The arrangements described herein as aspects of the present application provide improved bandwidth in a network by providing multiple channel signal processing using, for example, a dual core processor with a single RF antenna and transceiver.

In one example arrangement, a system includes a plurality of communication nodes coupled to one another via an over the air interface, at least one of the communication nodes including an antenna for transmitting and receiving signals on the over the air interface; a radio transceiver coupled to the antenna for receiving signals and having an output for transmitting signal samples; and a dual core processor coupled to the radio transceiver, the dual core processor further including a first CPU and a second CPU, the first CPU configured to process signals for a first channel within the signal samples received from the radio transceiver, and the second CPU configured to process signals for a second channel within the signal samples received from the radio transceiver.

In an example method arrangement, the method includes: receiving at an antenna multiple channel signals from an over the air interface; sampling the received multiple channel signals to form a sampled signal having data corresponding to the multiple channel signals; inputting the sampled signal to a dual core processor device comprising at least a first CPU and a second CPU; transmitting a first copy of the sampled signal to the first CPU of the dual core processor and transmitting a second copy of the sampled signal to the second CPU of the dual core processor; frequency shifting the second copy of the sampled signal to form a frequency shifted signal; pass filtering the first copy of the sampled signal to isolate a first channel signal and pass filtering the frequency shifted signal to isolate a second channel signal; and independently processing the first channel signal in the first CPU and independently processing the second channel signal in the second CPU.

In still another example arrangement, a smart utility network includes a plurality of communication nodes each coupled to a utility meter and each configured to transmit and receive data over the air interface, at least one of the plurality of communication nodes further including an antenna for transmitting and receiving signals on the over the air interface; a radio transceiver device coupled to the antenna for receiving signals and having an output for transmitting signal samples; and a dual core processor coupled to the radio transceiver device, the dual core processor further including a first CPU and a second CPU, the first CPU configured to process signals for a first channel within the signal samples received from the radio transceiver device, and the second CPU configured to process signals for a second channel within the signal samples received from the radio transceiver device.

In still another alternative arrangement, an integrated circuit includes at least a first processor and a second processor configured to execute instructions to perform signal processing; an inter-processor communications block coupled between the first processor and the second processor; a first co-processor corresponding to the first processor and configured to receive signal samples including multiple channel signals; and a second co-processor corresponding to the second processor; the first co-processor coupled to the second co-processor using the inter-processor communications block and the first co-processor configured to transmit a copy of received multiple channel signals to the second co-processor.

Use of the various arrangements provides greatly increased system bandwidth in a network at minimal additional cost over prior known approaches.

BRIEF DESCRIPTION OF THE DRAWINGS

For a more complete understanding of the illustrative examples used to present aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
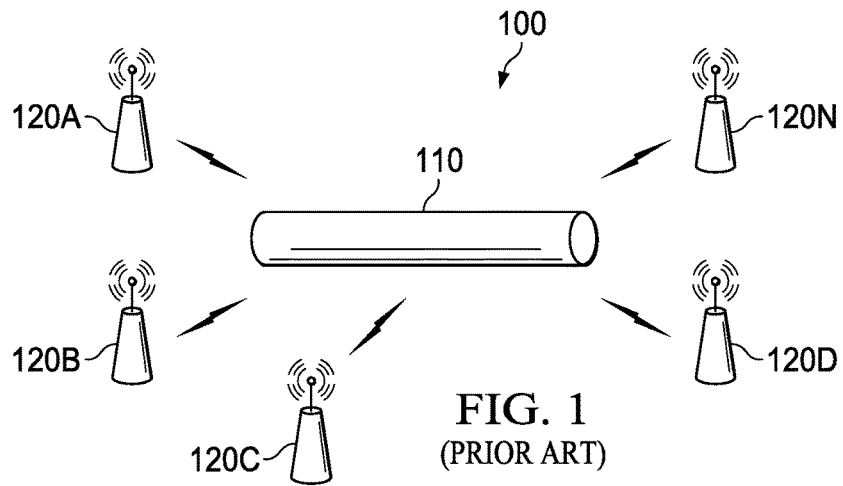
FIG. 1 is an illustration of a traditional SUN network.
Figure 2:
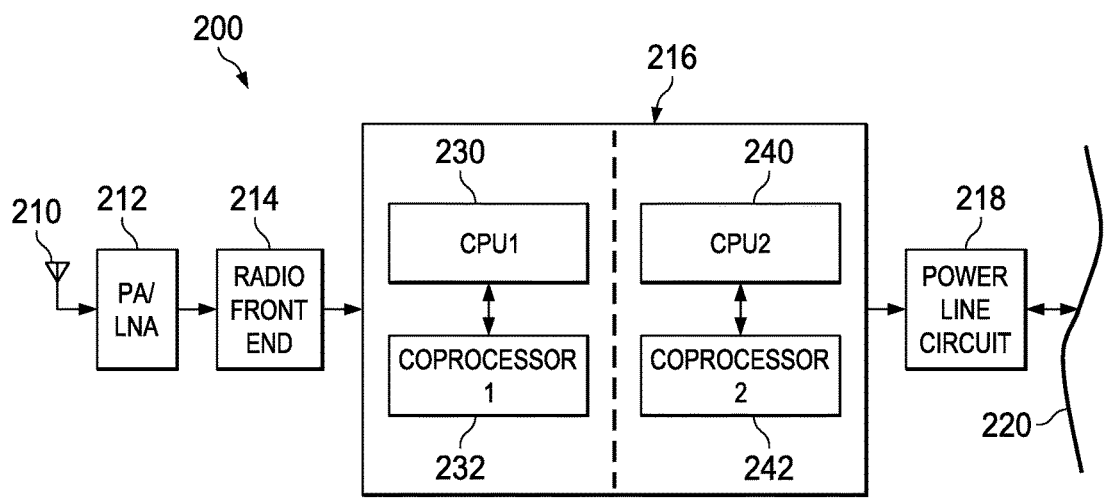
FIG. 2 is a block diagram of a prior art transceiver used in a SUN network.

The making and using of various examples illustrative arrangements that incorporate various aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected", the term "coupled" is not to be limited to "connected" or "directly connected" but instead the term "coupled" may include connections made with intervening elements, and additional elements and various connections may be used between any elements that are described as "coupled."

The methods disclosed herein can be implemented in a variety of ways. The methods can be implemented and performed by programmable devices executing instructions, for example. The methods can be implemented in software or in firmware or machine language instructions. Alternatively, programmable logic can be used to form dedicated hardware solutions. Devices that can be configured to perform the methods, including field programmable gate arrays (FPGAs), complex logic programmable devices (CPLDs) and application specific integrated circuits (ASICs) can be used to implement the arrangements. A system on a chip (SOC) integrated circuit can be formed including a CSMA (Carrier Sense Multiple Access) transceiver with a signal sampler and ADC converter for forming digital samples can be used. A processor such as a CPU, microcontroller unit (MCU), mixed signal processor (MSP) or a digital signal processor (DSP) and memory including RAM, ROM, Flash, volatile and non-volatile types, EEPROM and the like can be used. The arrangements can be implemented using several commercially available integrated circuits provided on a circuit board or within a module to form a complete solution.

Aspects of the present application improve on the existing prior known solutions by enabling multi-channel communication and an architecture to enable a dual core processor to be configured as a dual channel modem. In another aspect, simultaneous multiple channel preamble detection and carrier sense multiple access with collision avoidance (CSMA/CA) detection can be implemented while using a single RF front end utilizing both of these innovations. In one aspect of the present application, the dual channel modem concept can be achieved in either the time domain or the frequency domain as shown in the following figures. In addition, in alternative arrangements each transceiver can support negotiation for carrier access for multiple channels simultaneously. Further, in still another arrangements, the multiple channel communication can utilize different modulation from one another, that is, a node can communicate on one channel using FSK, for example, and on another using OFDM, QPSK, or other modulation schemes. Alternatively, additional arrangements can use a common modulation scheme in two or more channels, but having different symbol rates. Further, although the examples discussed here illustrate the use of two channels, three, four or more channels can be used, and instead of a dual core processor, multiple core processors of even greater numbers of cores can be used to form additional aspects of the present application.

Figure 3:
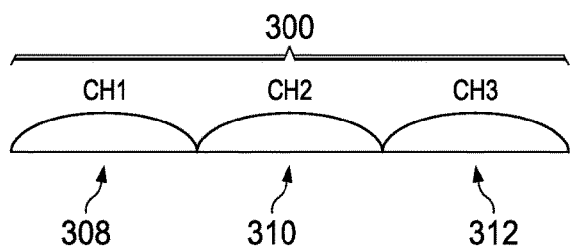
FIG. 3 illustrates three channels of information consecutively spaced within a signal bandwidth.

FIG. 3 illustrates, in one non-limiting example, three channels of information consecutively spaced within a signal bandwidth. In other aspects of the present application that form alternative arrangements, more or less channels can be used within a signal bandwidth. In a given signal bandwidth 300, the allocated spectrum can be divided into multiple channels. In this example, three channels are shown as CH1 (channel 1) 308, CH2 (channel 2) 310 and CH3 (channel 3) 312 each shifted from the center frequency of the allocated bandwidth. The individual channel frequency widths may be equal or can be unequal in width.

Figure 4:
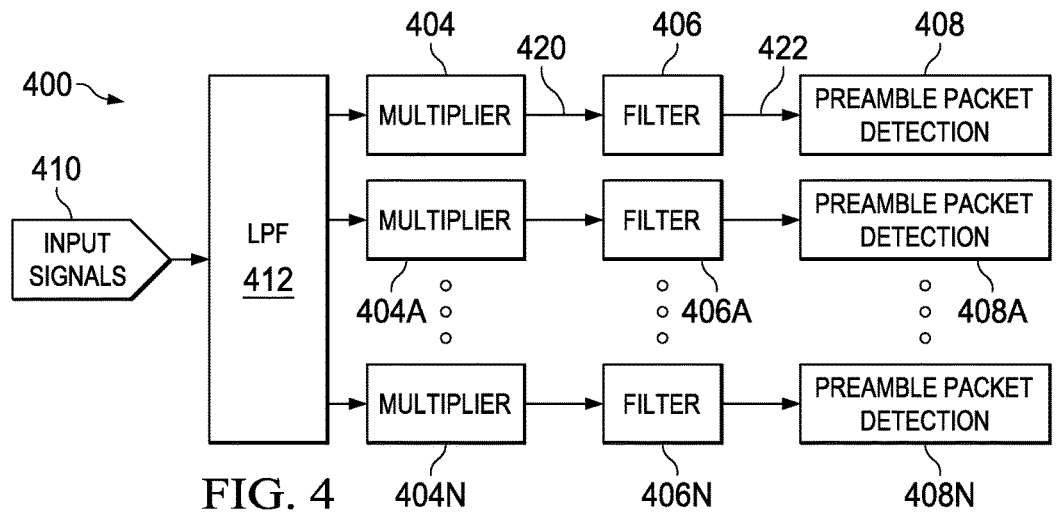
FIG. 4 is a block diagram illustrating simultaneous detection of multiple preambles in the time domain.

FIG. 4 is a block diagram illustrating an arrangement and signal flow for simultaneous detection of multiple preambles in the time domain. In system 400, the baseband input signal 410 is coupled to a low pass filter (LPF) 412. The output of the low pass filter 412 is coupled to a series of simultaneous processes shown in rows beginning with 404 for CH1 (channel 1), 404A for CH2 and 404N for CHN. Describing the process sequence for CH1, the top most row, the low pass filter 412 is coupled to a multiplier block 404 which is coupled to a channel specific filter 406. Channel specific filter 406 is coupled to a single channel preamble/packet detection block 408. Other channel information is processed simultaneously in a similar fashion as indicated by blocks 404A through 408N. The processes are arranged in parallel, as shown.

In the example multi-channel time domain preamble detection of system 400 in FIG. 4, the base band signal 410 enters the low pass filter (LPF) 412 limiting the output to those signals in the desired frequency band. Following the LPF, the signal is processed through a multiplier block 404 which implements the relationship given by EQ. 1 to shift the channel information to the center frequency:

$$CHn = (\text{Input Signal}) \times (\exp^{(j2\pi F_n t)}) \qquad \text{EQ. 1}$$

Where:
  n=channel number
  t=time
  $F_n$=frequency delta between CH n and central frequency.

After the multiplication block 404 the channel signal 420 has now been normalized to be as if it had been transmitted as a single channel signal. Signal 420 now passes through a filter 406 leaving a signal 422 which looks like a traditional single channel signal. Signal 422 can now be processed by packet detection (including preamble detection and packet decoding) block 408. At this stage, the signal is processed by conventional packet detection methods in block 408. Separate and distinct preamble packet detection for each of the channels (408 through 408N) enables each channel to use the same or a different type of modulation and data rate. For example, CH1 could use a FSK (frequency shift keyed) modulation and CH2 could use an OFDM (orthogonal frequency-division multiplexing) modulation while CH3 could use an O-QPSK (offset quadrature phase shift keying) modulation. Aspects of the present application include arrangements that can also be utilized for multi-channel frequency domain communication.

Figure 5:
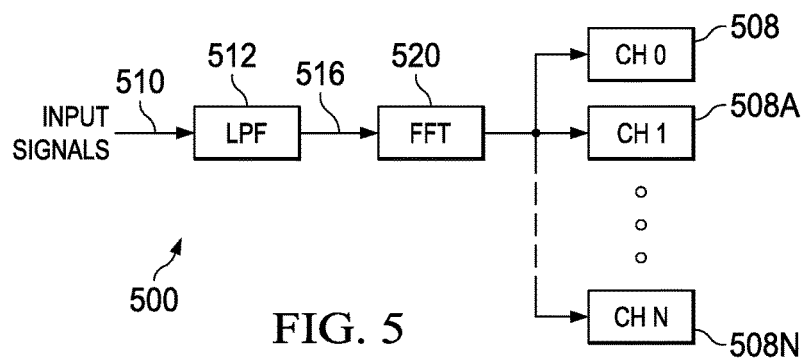
FIG. 5 is a block diagram illustrating simultaneous detection of multiple preambles in the frequency domain.

FIG. 5 is a block diagram illustrating a system arranged for simultaneous detection of multiple preambles in the frequency domain. In system 500, the baseband input signal 510 is coupled thru a LPF (low pass filter) 512 which is coupled to a FFT (fast Fourier transform) block 520. The output of the FFT 520 is coupled to preamble packet detection blocks 508, 508A, 508B, 508N corresponding to channels CH 0, CH 1, to CH N.

In system 500, the baseband input signal 510 passes through a low pass filter 512 allowing only signals in the spectrum of interest to pass. The filtered output signal 516 is coupled to an FFT block 520, where the filtered input signals 516 are converted from the time domain to the frequency domain. The frequency components for each channel are then routed to their individual preamble detection blocks 508 through 508N where conventional preamble detection methods may be used to for signal detection. Separate and distinct preamble detection for each of the channels (508 through 508N) enables each channel to run the same or to use a different type of preamble. For example, CH1 and CH2 can use an OFDM preamble while CH3 can use a PSK preamble.

Another aspect of the present application is the improvement of network throughput by enabling multi-channel CSMA for Smart Utility Networks using multi-channel preamble detection.

Figure 6:
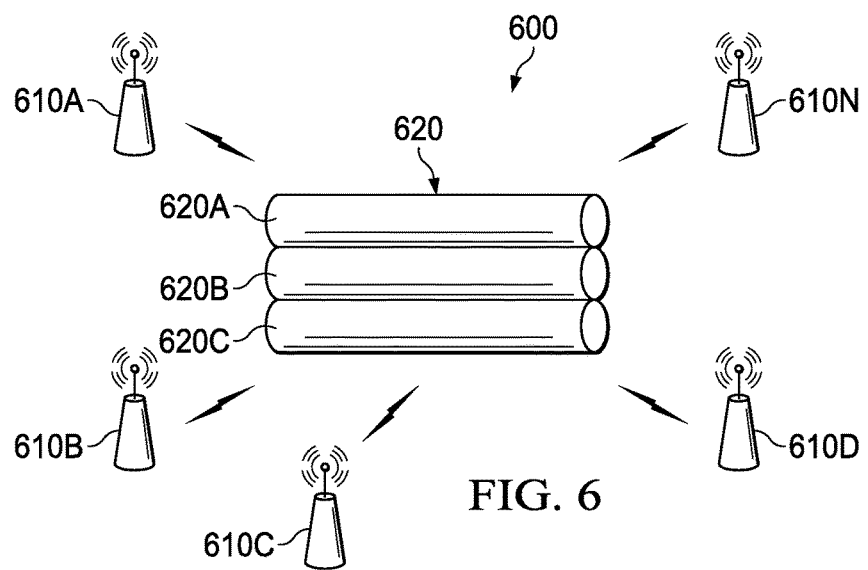
FIG. 6 depicts a multi-channel smart utility network.

FIG. 6 depicts a multi-channel smart utility network 600. In FIG. 6, multiple transceivers 610A through 610N communicate with a SUN (smart utility network) 620. In this non-limiting example arrangement, the network 620 hosts 3 communication channels 620A, 620B, 620C. An individual node 610A can be a legacy system capable of communicating on a single channel. Using CCA (clear channel assessment) sensing, the transmitter in transceiver 610A can randomly select an idle channel to transmit on. Another node, node 610D for example, can instead be capable of transmitting on multiple channels simultaneously. An example procedure for determining which channels transceiver 610D can transmit on can be performed using EQ. 2:

$$\text{Transmit Channels} = \text{random}(\min(k,n), \epsilon), \ n \leq N, \ k \leq N \quad \text{EQ. 2}$$

Where—
N=total channel count
n=count of idle channels
$\epsilon$=set of n idle channels Thus as shown in FIG. 6, a utility network using aspects of the present application can support legacy devices capable of only single channel transmission and reception, alongside and communicating with devices incorporating arrangements of the present application for multi-channel communications, without the need for modification of or replacement of the legacy devices.

Yet another aspect of the present application provides an architectural implementation of a communication gateway between the cores of a multi-core processor to enable simultaneous signal processing for multi-channel SUN transceivers. An example of this architecture is shown in the following figures.

Figure 7:
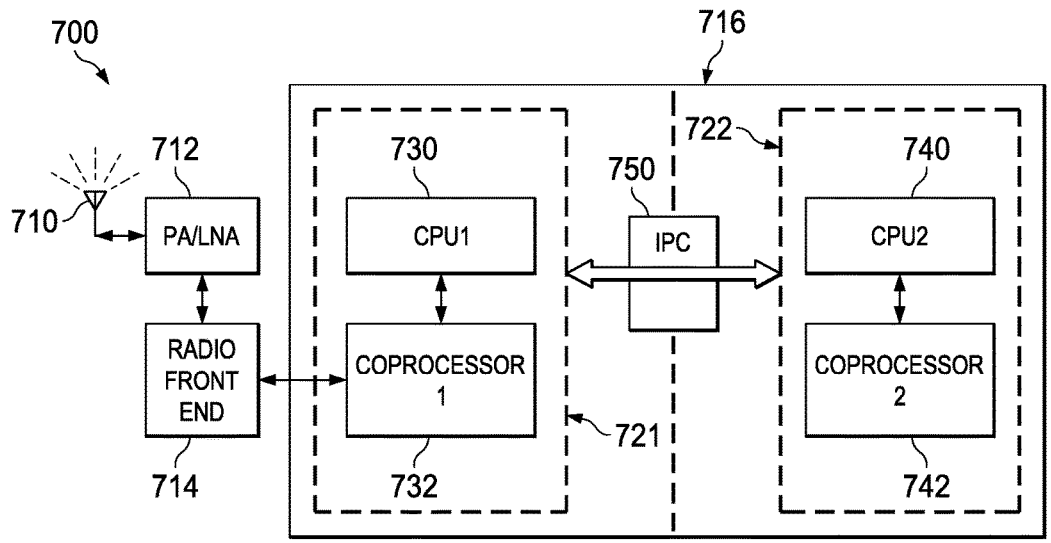
FIG. 7 is a block diagram depicting a dual-channel modem arrangement of the present application.

FIG. 7 is a block diagram depicting a dual-channel modem 700. In FIG. 7, antenna 710 is coupled to a PA/LNA 712 (Power Amplifier/Low Noise Amplifier) and then to the RF radio front end circuit 714. The radio circuit 714 is coupled to a dual core processor 716. In this example, the dual core processor 716 contains a pair of CPUs or DSPs. CPU1 730 is coupled to coprocessor (coprocessor 1) 732 and an IPC (inter-processor communication) module 750. CPU2 is coupled to coprocessor (coprocessor 2) 742 and to the IPC module 750.

Within the dual-core processor 716, each of the CPUs and co-processor core pairs are configured as modems: modem-1 721 and modem-2 722.

In this non-limiting illustrative example using a dual core architecture, during the receiving function, the input RF signal is detected by the antenna 710 and the signal is then amplified by the power amplifier/low noise amplifier PA/LNA 712. The radio circuit 714 receives the input signal, samples it and communicates the sampled signal to the first coprocessor 732 within the first modem M1. Coprocessor 1, numbered 732, performs a low pass filter and automatic gain control (AGC) function on the sampled data. The resultant input signal samples, which contain combined data for two channels CH1 and CH2, is then used by both modems M1, M2 as follows. The first copy of the sampled data is processed by modem M1 through an internal low pass filter to eliminate CH2 data from the signal. At this point, the signal contains only CH1 data and now looks like a traditional single channel signal. This signal is routed to CPU1 730 which is configured as a traditional software defined radio for a smart utility network where the baseband signal process is performed. Preamble detection and reception of incoming data signals are then achieved.

The second copy of the sampled input signal is sent from the coprocessor 732 to the second coprocessor (coprocessor 2) 742 via the IPC module 750. Modem M2 shifts the center frequency of the sampled signal to the center of CH2 data by multiplying the sampled signals shown in EQ. 1. With the CH2 data at the center frequency the sampled signal now passes through a pass filter to eliminate CH1 from the signal. At this point, the signal now looks like a traditional single channel signal containing only the CH2 data signals. This signal is routed to CPU2 740 which is configured as a traditional software defined radio for a smart utility network where the baseband signal process is performed. In this manner both of the processors of a dual core processor integrated circuit can be used to perform multi-channel communications over a single antenna. In other alternative arrangements that form aspects of the present application, additional processors can be used to perform receivers for a third, or fourth channel or more channels from the signals received at a single antenna.

The dual core processor 716 can be formed as a single chip device, or as a module or circuit board. As an example, a commercially available integrated circuit available from Texas Instruments Incorporated, designated by part no. TMS320F28377D, is a dual core integrated circuit that provides two C28x DSP digital signal processors, each with a Control Law Accelerator (CLA) co-processor for performing floating point operations. The two cores are linked by an inter-processor communications block (IPC) that has at least two methods for transferring data, a message RAM which can be used to transmit and receive data between the two CPUs, and a shared RAM which can be read and written by each of the CPUs. The TMS320F28377D also has a Universal Parallel Port (UPP) which can be used to link the device to the RF radio transceiver such as 714 in FIG. 7.

Texas Instruments Incorporated also provides integrated radio transceivers such as the CC1260 that can be used as the radio transceiver 714. The CC1260 is referred to as a "Sub-1-Ghz RF I/Q Front End for Software-Defined Radio and IEEE 802.15.4g" device, and it provides a single chip quadrature RF transceiver with a digitized interface for coupling to a processor, such as a DSP, for example. The CC1260 is currently commercially available from Texas Instruments Incorporated, Dallas, Tex. USA. Other similar devices also available from Texas Instruments Incorporated that can be used to form the arrangements of the present application. These highly integrated single-chip radio transceiver devices enable simple system designs by allowing the use of few external components and providing the filtering, data buffering, clear channel assessment and other functions to be performed outside of the CPU; freeing the CPU for other tasks.

While the arrangements herein can be performed using the Texas Instruments TMS320F28377D as the dual core devices, and using the Texas Instruments CC1260 as the radio transceiver device, the arrangements can also be implemented using a variety of other devices or using custom or semi-custom devices such as ASICs, CPLDs, FPGAs and the like. The use of an integrated dual core processor is not necessary to implement the arrangements, instead, a circuit board or module can be used with individual processor devices to form a dual core processor board, for example.

Figure 8:
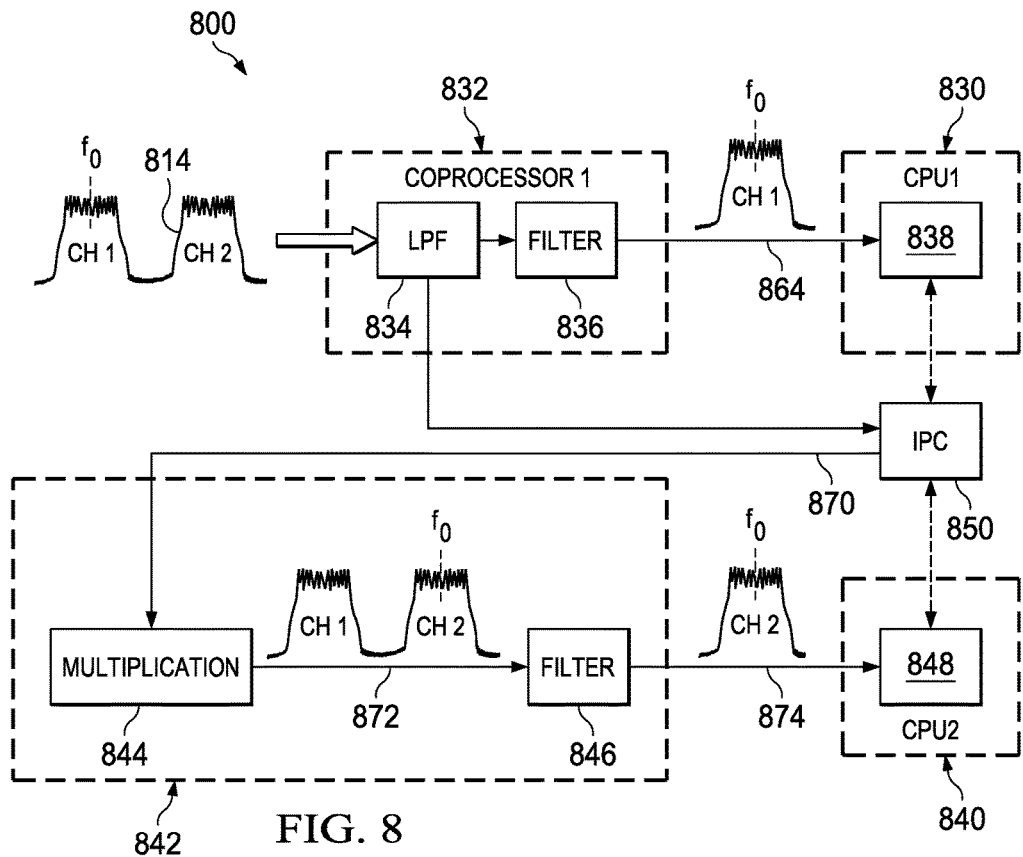
FIG. 8 is a block diagram of a system architecture arrangement configured for the simultaneous processing of a multiple channel input signal.

FIG. 8 is a block diagram of a system architecture 800 illustrating the simultaneous processing of an input signal 814 utilizing the IPC module architecture in a receiving mode. In system 800, the input signal 814 is coupled to coprocessor (coprocessor 1) 832 which is coupled to CPU1 830. CPU1 is coupled to an IPC module 850 which is coupled to CPU2 840. The coprocessor 842 is coupled to CPU2 840. Within coprocessor 1, numbered 832, input signals from 814 are coupled to a process 834. Process 834 has 2 outputs, one coupled to 836 and another one coupled to the IPC gateway 850 thru CPU1 830. Process 836 is contained within coprocessor 1, 832, and is coupled to process 838 which is performed within CPU1 830. The coprocessor 842 contains process 844 which is coupled to the IPC module 850 through CPU2 840. Output from process 844 is coupled to process 846, which is coupled to process 848 within CPU2 840. Further, the IPC gateway 850 can instead be arranged to couple the CPU1 device to the CPU2 device directly instead of coupling the co-processors, as indicated by the dashed arrows in FIG. 8. Note that in this example arrangement and in other examples presented for explanatory purposes herein, certain processes are shown as separated blocks, however, it is within the scope of the present application to form alternative arrangements where these process blocks are combined together, or, alternatively, are further partitioned into additional processes. These alternative arrangements are contemplated by the inventors as forming additional aspects of the present application and fall within the scope of the appended claims.

In operation of the system 800, the input signal 814 is a sampled signal received from the radio front end (not shown). As depicted in this example, the first channel CH1 signal is located at the center frequency $f_0$ and the second channel CH2 signal is shifted above the center frequency. The sampled signal is communicated directly to the coprocessor 1, 832. Within the coprocessor 1, 832, a low pass filter and automatic gain control (LPF) process 834 is performed on the samples to pass only the CH1 and CH2 signal. From filter process 834, copies of the signal are coupled to both a low pass filter process 836 and to the IPC gateway 850 thru CPU1 830. Following the signal thru low pass filter process 836, which only passes the CH1 signal, the resulting signal 864 contains the CH1 signal situated at the center frequency $f_0$ which now looks like a prior known single channel signal as depicted as 864 in FIG. 8. CPU1 830 performs standard single channel baseband processing shown in block 838 on the CH1 signal 864.

Returning to the second copy of the input signal 862 flowing out of low pass filter and AGC 834 and thru the IPC module 850, the second copy of the input signal arrives at a multiplication block 844 within coprocessor 842. Block 844 multiplies the signal per EQ. 1 which results in shifting the CH2 signal to the center frequency depicted as 872 in FIG. 8. The shifted input signal 872 now passes through a low-pass filter process 846 to only pass the CH2 signal which now looks like a prior known single channel signal depicted as 874 in FIG. 8. CPU2 840 performs standard single channel baseband processing in the process block 848 on the CH2 signal 874. The IPC module 150 thus provides an aspect of the present application allowing simultaneous dual channel processing.

By using the novel approaches of the arrangements herein, each of the dual core processors can independently process communications data simultaneously to provide multi-channel communications from a single antenna. The modifications needed to provide the increased bandwidth of the arrangements are mainly performed as changes in software processing, and the dual core processor has an additional inter-processor communications module 850 to pass the copy of the input signal samples to the second processor, but is largely unchanged from the prior known approaches, attaining the advantages of the present application at a relatively low cost of implementation of the novel approaches. The multi-channel communications can include channels with the same modulation or with different modulation schemes. In a non-limiting illustrative example, in one arrangement of the present application the different channels can use the same modulation scheme with different symbol rates. One channel can perform frequency shift keyed (FSK) modulation with a rate of 50 k symbols per second (50 ksps) while the other channel can perform FSK modulation with a symbol rate of 100 ksps. The multi-channel communications can also include independent negotiation for carrier bandwidth using carrier sense multiple access with collision avoidance (CSMA/CA) detection.

Figure 9:
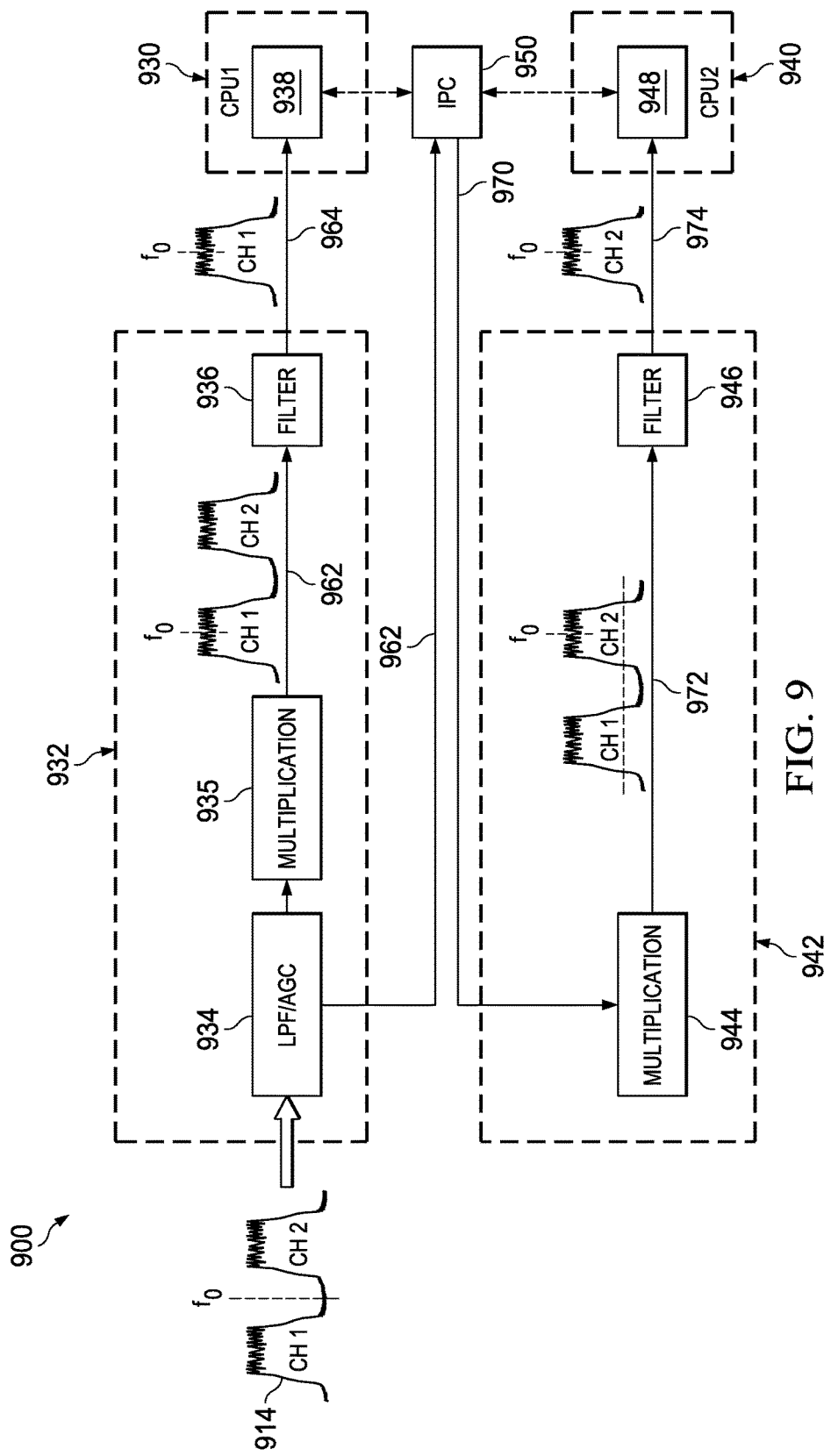
FIG. 9 is a block diagram of a system architecture arrangement illustrating the simultaneous processing of another multiple channel input signal.

FIG. 9 is a block diagram illustrating a system 900 having an architecture configured for the simultaneous processing of another input signal utilizing the IPC module in a receive mode. In system 900, the input signal 914 is coupled to coprocessor 932 which is coupled to CPU1 930. CPU1 is coupled to IPC module 950 which is further coupled to CPU2 940, either directly or alternatively by coupling the coprocessors corresponding to each of the CPU devices as indicated by the dashed lines in FIG. 9. The coprocessor 942 is coupled to CPU2 940. Within the first coprocessor 932, input signals 914 are coupled to a process 934. Process 934 has 2 outputs, one coupled to 935 and the second to the IPC module 950 thru CPU1 930. Process 935 is contained within coprocessor 932 and is coupled to process 936 which is further coupled to process 938 inside CPU1 930. The coprocessor 942 contains a process 944 which is coupled to the IPC module 950 through CPU2 940. Output from process 944 is coupled to process 946, which is further coupled to process 948 within CPU2 940.

In operation of the system 900, as shown in FIG. 9, the input signal 914 is received as a sampled signal from the RF front end and transmitted with the center frequency $f_0$ centered between channels CH1 and CH2 depicted as 914. The sampled input signal is communicated directly to the first coprocessor 932. Within the coprocessor 932, a low pass filter and automatic gain control (LPF/AGC) process 934 is performed on the sampled signal to pass only the CH1 and CH2 signal. At the output of process 934, copies of the signal are shown going to a multiplication block 935 and to the IPC gateway 950 through CPU1 930. Within the multiplication block 935, the signal is multiplied as shown in EQ. 3:

$$CHn = (\text{Input Signal}) \times (\exp^{(j\pi F n t)}) \quad \text{EQ. 3}$$

Where:
  n=channel number
  t=time
  $F_n$=frequency delta between CH n and central frequency This operation shifts the CH1 signal to be centered at the center frequency depicted as 962 in FIG. 9. After the multiplication block 935 the frequency shifted signal flows through a low pass filter 936, which only passes CH1 signal depicted as 964. The resulting signal 964 contains CH1 situated at the center frequency $f_0$ and is now comparable to a prior known single channel signal. CPU1 930 then can perform standard single channel baseband processing in block 938 on CH1 signal 964.

Returning to the second copy of the input signal 962 flowing out of low pass filter and AGC process 934 thru the IPC module 950, the signal arrives at multiplication block 944 within coprocessor 942. Block 944 multiplies the signal as shown in EQ. 4:

$$CHn = (\text{Input Signal}) \times (\exp^{(j\pi F_n t)})  \quad \text{EQ. 4}$$

Where:
n=channel number
t=time
$F_n$=frequency delta between CH n and central frequency The operation of EQ. 4 shifts the CH2 signal to the center frequency, depicted as 972 in FIG. 9. The shifted signal 972 is processed through a filter process 946 to only pass the CH2 data, depicted as 974, and signal 974 is now a normal single channel signal for the second channel. CPU2 940 then performs standard single channel baseband processing in block 948 on CH2 signal 974. The IPC module architecture enables an aspect of the present application improving the architecture to allow simultaneous dual channel processing. In this example the two channels CH1 and CH2 are each spaced from the center frequency in the input signal, in contrast to the example of FIG. 8 above. Other arrangements are possible, including additional channels within the input signal, and these additional arrangements are also contemplated by the inventors as forming additional alternative aspects of the present application that fall within the appended claims.

Figure 10:
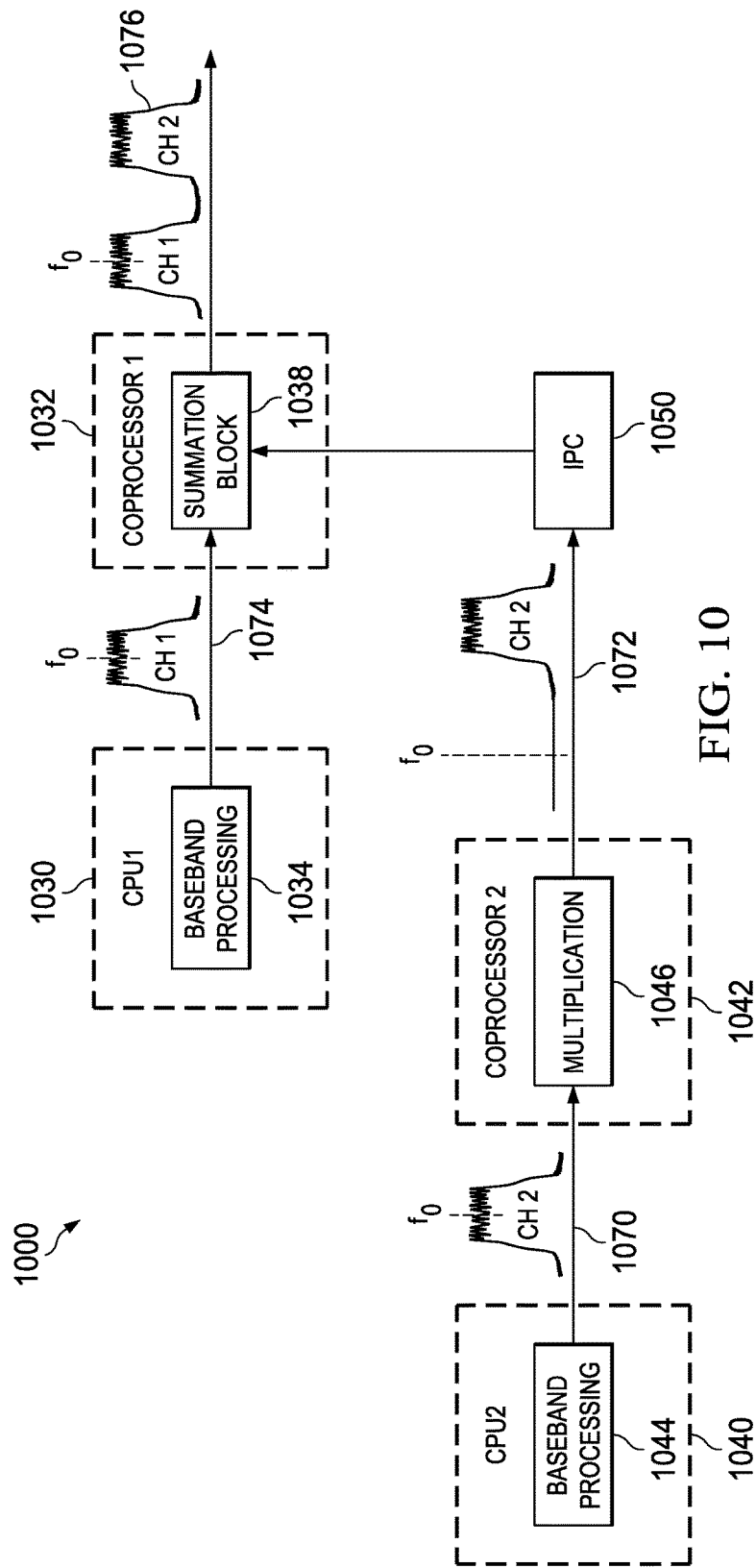
FIG. 10 is a block diagram illustrating an arrangement for simultaneous processing of multiple channel signals for transmission.

FIG. 10 is a block diagram illustrating in an arrangement that forms an additional aspect of the present application a system 1000 configured for the simultaneous processing of a pair of data signals utilizing a dual core processor with an IPC architecture in the transmit mode. In FIG. 10, CPU1 1030 is coupled to coprocessor 1, numbered 1032. CPU2 1040 is coupled to coprocessor 1042 which is coupled to the IPC module 1050, which is further coupled to CPU1 1030. Within CPU1 1030, process 1034 is coupled to process 1038 within coprocessor 1, 1032. The IPC module 1050 is also coupled to CPU1. Within CPU2 1040 baseband process 1044 couples to process 1046 in coprocessor 2, 1042, which is coupled to the IPC module 1050. Within coprocessor 1, 1032, summation block process 1038 is coupled to the IPC module 1050 via CPU1, 1030.

In operation, in system 1000, CPU2 1040 receives CH2 data and performs baseband processing 1044 to create standard single channel data shown as 1070 centered on the center frequency $f_0$. The single channel data 1070 is then shifted from the center frequency in multiplication block 1046 within coprocessor 2, numbered 1042, resulting in signal 1072. CH2 signal 1072 is then transferred to the summation block 1038 utilizing the IPC module 1050 architecture.

CPU1 1030 receives CH1 data and performs baseband processing 1034 to create standard single channel data 1074 centered at the center frequency $f_0$. The single channel data is then transmitted to the summation block 1038 within coprocessor 1, numbered 1032. The summation block 1038 combines the two input signals 1072 and 1074 resulting in a signal 1076 containing the data from each signal as depicted in FIG. 10. The coprocessor 1, 1032, then transfers the combined signal to a RF front end (not shown) for transmission at an antenna. In this example, the two channel signals CH1 and CH2 (in other additional alternative arrangements, additional channels can be combined) are then transmitted over a single antenna, providing multi-channel communications using the dual cores to simultaneously transmit the data, thereby increasing bandwidth for the network without the need for adding additional hardware using straightforward modifications to the dual core processor and to the software used in prior known solutions.

Figure 11:
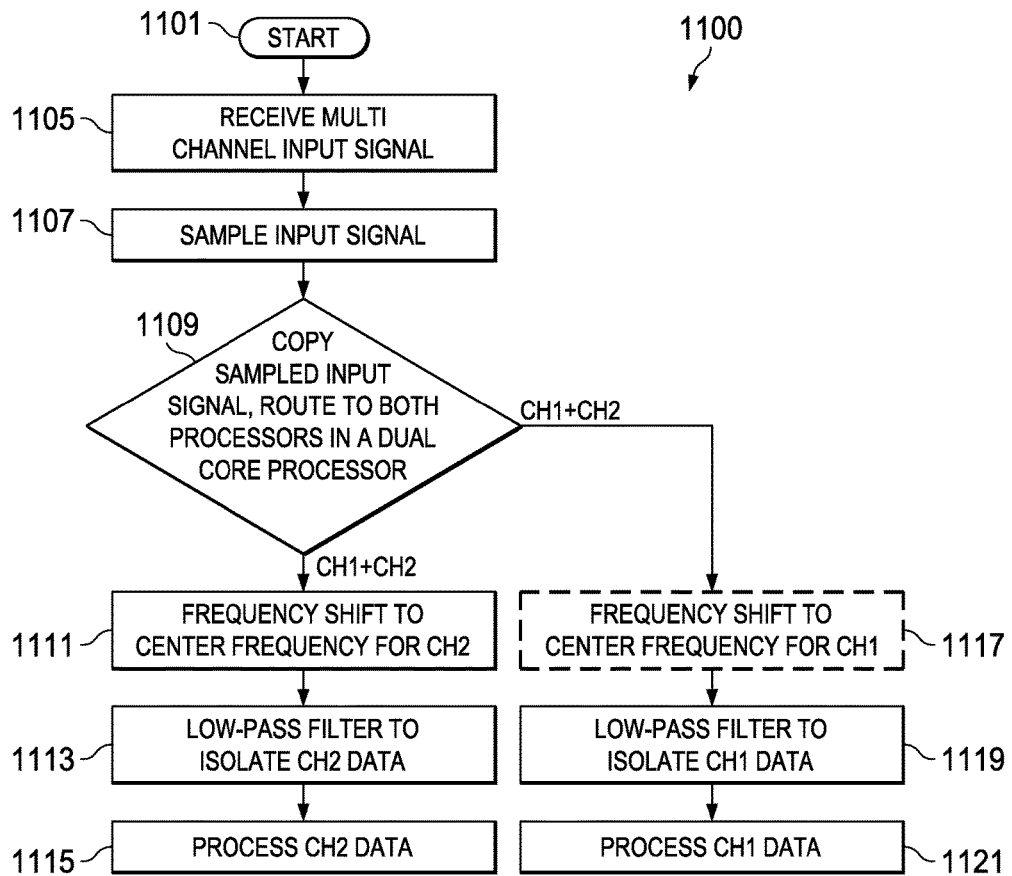
FIG. 11 is a flow diagram illustrating a method arrangement for simultaneous processing of a multiple channel input signal.

FIG. 11 depicts in a flow diagram an example method arrangement 1100 for receiving and processing multi-channel signals using a dual core processor architecture of the arrangements. In FIG. 11, the method begins at step 1101, "Start". At step 1105, the method continues by receiving the input signal including multiple channels, for example, channel 1 and channel 2 at different frequencies. At step 1107, "Sample input signal", the input signal is sampled for processing. At step 1109, a copy of the sampled input signal containing both channel 1 and channel 2 signals (in this non-limiting illustrative example) is coupled to both processors of a dual core processor, for example. In an example arrangement as described above, this can be implemented using an inter processor communications block disposed within the dual core processor, however, in alternative arrangements that are also contemplated as forming additional aspects of the present application, the copied signal can be coupled to the two processors using other hardware or other methods.

Continuing with the method of FIG. 11, in step 1111, the copied signal is frequency shifted to center the frequency for the channel 2 signals. At the same time, in step 1117, the copied signal is separately processed to center the frequency for channel 1 signals at a separate processing step; in this manner the two channels are independently processed. If, as described above, the input signal has channel 1 at the center frequency, this step 1117 can be omitted as indicated by the dashed lines surrounding step 1117. However, if instead the channel 1 signal is frequency offset from the center frequency, it is shifted at step 1117 as shown.

At step 1113, a low-pass filter is applied to the signal now centered for channel 2 signals to remove the remaining channel 1 data, and the output is a single channel containing channel 2 data. At step 1115, the channel 2 signal is processed, for example, preamble detection can be performed to initiate reception of a message.

At the same time as step 1113 is performed, at step 1119 a low-pass filter is applied in parallel to the other copy of the signal to isolate the channel 1 signals for processing. At step 1121, the single channel signal is then processed for signal reception. These steps are performed simultaneously or contemporaneously with the processing of the channel 2 signals.

Using the method of FIG. 11, then, two (or more, in additional alternative arrangements) channels of signal data can be received at a single antenna and can be independently processed, doubling the bandwidth of the communications network, or alternatively increasing the bandwidth even more if additional channels are processed.

Figure 12:
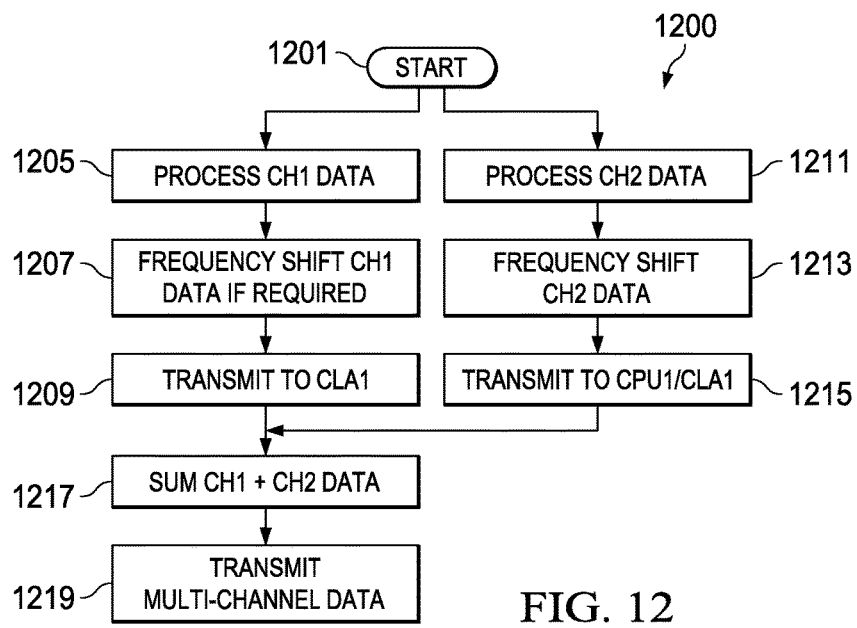
FIG. 12 is a flow diagram illustrating an additional method arrangement for simultaneous processing of multiple channel signals for transmission.

FIG. 12 illustrates in a flow diagram a method arrangement 1200 for transmitting multiple channel data using a single RF front end and RF antenna.

In FIG. 12, the method 1200 begins at step 1201, "Start". Steps 1211 and 1205 are performed in parallel, for example, by the two processors of a dual processor core device as is described above. In each of the steps, data for transmission on a single communications channel is processed. At step 1211, the channel 2 data is processed while at step 1205, the channel 1 data is processed. Steps 1213 and 1207 are also performed independently and in parallel. At step 1213, the channel 2 data is frequency shifted. This is done to allow the channel 2 data to be transmitted with the channel 1 data. At step 1207, the channel 1 data can be frequency shifted if desired, or, it can remain at a nominal frequency f0. At step 1215, the channel 2 data is transmitted, for example using an inter processor communications module or other communications device as described above, and it is transmitted to the CPU1 or to the corresponding co-processor such as CLA1 as is described above. At step 1209 the channel 1 data is also transmitted to CLA1.

At step 1217 the two signals are summed to from a multiple channel data signal with the two channels separated in frequency. This summing operation can be performed, for example, by a co-processor or by a CPU such as CLA1, CPU1 as described above. As an alternative approach, a dedicated hardware block can be provided to sum the two signals.

At step 1219 the multiple channel signal can be transmitted over an RF antenna.

Using the method of FIG. 12, a single RF antenna is used to transmit multiple channel information, thereby enabling the increase of system bandwidth by modifying software in the dual core processor device, and without a substantial increase in cost.

In an example implementation using the Texas Instruments TMS320F28377D dual core DSP based processor, OFDM modems were used operating in the band of 902 MHz-928 MHz with a channel spacing of 400 kHz. The multiple channel modems can operate on any two adjacent consecutive channels in the band. For example channel 1 at 902.4 MHz, and channel 2 at 902.8 MHz. For receiving operations, the radio front end device is set to 902.4 MHz as the central frequency, with a sampling rate of 1.3M/s as the output sample rate, and 600 kHz as the bandwidth for the low pass filter. In the co-processor CLA1, after automatic gain correction (AGC), a low pass filter with 400 kHz bandwidth processes the signal and reduces the rate to 1/3M samples per second. The data it then passed on to the CPU CPU1 for further processing as prior single channel data.

At the same time, the raw samples are passed using the inter-processor communications gateway to the second CPU, CPU2, and multiplied by $e^{-j2\pi f_c t}$ where fc=400 kHz. The data for channel 2 are then pass filtered and the sample rate is reduced to 1/3M samples per second, and the data are passed to the second CPU, CPU2, for processing as a single channel data signal.

For transmission, in this same implementation example, the first CPU, CPU1, generates the baseband OFDM signals for channel 1 and upsamples the signal to 16/3 M samples per second, as for a normal single channel transmission. At the same time, CPU2 generates baseband OFDM signals and shifts the signal by frequency shifting to 400 kHz in the frequency domain, for example. The channel 2 signals from CPU2 are then transmitted using the inter-processor communications module or IPC to pass the signals to CPU1. The two signals are combined in a summing operation and are then sent to the RF radio transceiver for transmission. In this example implementation, the RF radio used a carrier frequency of 902.4 MHz.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A system, comprising:
a plurality of communication nodes coupled to one another via an over the air interface, at least one of the communication nodes further including:
an antenna for transmitting and receiving signals on the over the air interface;
a radio transceiver coupled to the antenna for receiving signals and having an output for transmitting signal samples; and
a dual core processor coupled to the radio transceiver, the dual core processor comprising a first CPU and a second CPU, the first CPU configured to process signals for a first channel within the signal samples received from the radio transceiver, and the second CPU configured to process signals for a second channel within the signal samples received from the radio transceiver wherein the dual core processor further includes an inter-processor communication module coupling the first CPU to the second CPU.

2. A system, comprising:
a plurality of communication nodes coupled to one another via an over the air interface, at least one of the communication nodes further including:
an antenna for transmitting and receiving signals on the over the air interface;
a radio transceiver coupled to the antenna for receiving signals and having an output for transmitting signal samples; and
a dual core processor coupled to the radio transceiver, the dual core processor comprising a first CPU and a second CPU, the first CPU configured to process signals for a first channel within the signal samples received from the radio transceiver, and the second CPU configured to process signals for a second channel within the signal samples received from the radio transceiver, wherein the dual core processor further includes:
a first co-processor coupled to the first CPU and coupled to the output of the radio transceiver and having an output for transmitting signal samples; and
a second co-processor coupled to the second CPU and coupled to the first co-processor and configured to receive signal samples from the first co-processor.

3. A system, comprising:
a plurality of communication nodes one another via an over the air interface, at least one of the communication nodes further including:
an antenna for transmitting and receiving signals on the over the air interface;
a radio transceiver coupled to the antenna for receiving signals and having an output for transmitting signal samples; and
a dual core processor coupled to the radio transceiver, the dual core processor comprising a first CPU and a second CPU, the first CPU configured to process signals for a first channel within the signal samples received from the radio transceiver, and the second CPU configured to process signals for a second channel within the signal samples received from the radio transceiver wherein the dual core processor further includes:
an inter-processor communication module coupling the first CPU to the second CPU;
a first co-processor corresponding to the first CPU and coupled to receive signal samples from the radio transceiver and configured to transmit signal samples to the inter-processor communication module; and
a second co-processor corresponding to the second CPU and coupled to the inter-processor communication module and configured to receive signal samples from one of the first coprocessor and the first CPU.

4. The system of claim 1, wherein the dual core processor is configured to receive signals from the radio transceiver corresponding to a first channel and a second channel, and is configured to process the signals of the first channel in the first CPU, and to process the signals of the second channel in the second CPU independently of the first CPU.

5. The system of claim 4, wherein the dual core processor is further configured to process signals for transmission on the first channel in the first CPU, and to process signals for transmission on the second channel in the second CPU.

6. The system of claim 1, wherein the first CPU and the second CPU further include digital signal processors.

7. The system of claim 1, wherein the plurality of communication nodes form a communication network.

8. A method, comprising:
receiving at an antenna multiple channel signals from an over the air interface;
sampling the received multiple channel signals to form a sampled signal having data corresponding to the multiple channel signals;
inputting the sampled signal to a processor device including at least a first CPU and a second CPU;
transmitting a first copy of the sampled signal to the first CPU of the processor device and transmitting a second copy of the sampled signal to the second CPU of the processor device;
frequency shifting the second copy of the sampled signal to form a frequency shifted signal;
low-pass filtering the first copy of the sampled signal to isolate a first channel signal and low-pass filtering the frequency shifted signal to isolate a second channel signal; and
independently processing the first channel signal in the first CPU and independently processing the second channel signal in the second CPU.

9. The method of claim 8, and further including:
providing a first coprocessor corresponding to the first CPU and providing a second co-processor corresponding to the second CPU.

10. The method of claim 9, wherein inputting the sampled signal to the processor device further includes inputting the sampled signal to the first co-processor.

11. The method of claim 10, wherein transmitting a first copy of the sampled signal to the first CPU of the processor device and transmitting a second copy of the sampled signal to the second CPU of the processor device further includes transmitting the first copy of the sampled signal from the first coprocessor to the first CPU and transmitting the second copy of the sampled signal from one of the first CPU and the first co-processor to the second CPU.

12. The method of claim 11, wherein frequency shifting the second copy of the sampled signal to form a frequency shifted signal further includes performing a multiplication operation in at least one of the second co-processor and the second CPU.

13. The method of claim 12, wherein performing the multiplication operation further includes calculating:

$$CHn = (\text{Input Signal}) \times (\exp^{(j2\pi F_n t)})$$

Where:
n=channel number
t=time
$F_n$=frequency delta between CH n and central frequency.

14. The method of claim 8 and further including:
processing baseband information for transmission on a first channel in the first CPU in the processor device to form a first channel signal;
processing baseband information for transmission on a second channel in the second CPU in the processor device to form a second channel signal;
frequency shifting the second channel signal by performing a multiplication operation;
transmitting the frequency shifted second channel signal to the first CPU;
combining the first channel signal and the second channel signal to form a multiple channel signal; and
transmitting the multiple channel signal over the over the air interface.

15. A smart utility network, comprising:
a plurality of communication nodes each coupled to a utility meter and each configured to transmit and receive data over an over the air interface, at least one of the plurality of communication nodes further including:
an antenna for transmitting and receiving signals on the over the air interface;
a radio transceiver device coupled to the antenna for receiving signals and having an output for transmitting signal samples; and
a dual core processor coupled to the radio transceiver device, the dual core processor comprising a first CPU and a second CPU, the first CPU configured to process signals for a first channel within the signal samples received from the radio transceiver device, and the second CPU configured to process signals for a second channel within the signal samples received from the radio transceiver device.

16. A smart utility network, comprising:
a plurality of communication nodes each coupled to a utility meter and each configured to transmit and receive data over an over the air interface, at least one of the plurality of communication nodes further including:
an antenna for transmitting and receiving signals on the over the air interface;

a radio transceiver device coupled to the antenna for receiving signals and having an output for transmitting signal samples; and a dual core processor coupled to the radio transceiver device, the dual core processor comprising a first CPU and a second CPU, the first CPU configured to process signals for a first channel within the signal samples received from the radio transceiver device, and the second CPU configured to process signals for a second channel within the signal samples received from the radio transceiver device, wherein the dual core processor further includes:

a first co-processor corresponding to the first CPU; and a second co-processor corresponding to the second CPU.

17. The smart utility network of claim 15, wherein the dual core processor further includes:

an interprocessor communications device coupled between the first CPU and the second CPU.

18. The smart utility network of claim 15, wherein the dual core processor further includes the first CPU which is a digital signal processor, and the second CPU which is a digital signal processor.

19. The smart utility network of claim 15, wherein the dual core processor is a single integrated circuit.

20. The smart utility network of claim 15, wherein each one of the communication nodes is configured to transceiver signals on multiple channels using the radio transceiver device.

21. The smart utility network of claim 20, wherein at least two of the multiple channels utilize modulation schemes that differ from one another.

22. The smart utility network of claim 20, wherein each of the communication nodes is configured to perform carrier sense multiple access negotiation with collision avoidance on multiple channels.

23. The smart utility network of claim 20, wherein each of the communication nodes is further configured to communicate on three or more channels.

24. The smart utility network of claim 20, wherein each of the communication nodes is further configured to communicate on a first channel using FSK modulation, and on another channel using OFDM modulation.

25. The smart utility network of claim 20, wherein each of the communication nodes is further configured to communicate on a first channel using a first modulation scheme at a first symbol rate, and on a second channel using the first modulation scheme at a second symbol rate that differs from the first symbol rate.

26. The smart utility network of claim 25, wherein the first modulation scheme is a FSK modulation.

27. An integrated circuit, comprising:

at least a first processor and a second processor configured to execute instructions to perform signal processing;

an inter-processor communications block coupled between the first processor and the second processor;

a first co-processor corresponding to the first processor and configured to receive signal samples including multiple channel signals;

a second co-processor corresponding to the second processor; and the first co-processor coupled to the second co-processor using the inter-processor communications block and the first co-processor configured to transmit a copy of received multiple channel signals to the second co-processor.

28. The integrated circuit of claim 27 wherein the first co-processor and the second co-processor are further configured to perform band pass filtering to isolate a single channel of signals from received multiple channel signals.

29. The integrated circuit of claim 27 wherein the first co-processor is coupled to receive signal samples from an external input to the integrated circuit.

* * * * *